(12) United States Patent
Bai et al.

(10) Patent No.: US 8,228,032 B2
(45) Date of Patent: Jul. 24, 2012

(54) VOLTAGE BALANCE CIRCUIT TO TRANSFER ENERGY BETWEEN CELLS OF A DUEL CELL RECHARGEABLE BATTERY

(75) Inventors: QingGang Bai, Shenzhen (CN); ZhenDong Wu, Shenzhen (CN); Jun Zhou, Shenzhen (CN)

(73) Assignee: BYD Company Limited (CN)

( * ) Notice: Subject to any disclaimer, the term of this patent is extended or adjusted under 35 U.S.C. 154(b) by 699 days.

(21) Appl. No.: 12/341,031

(22) Filed: Dec. 22, 2008

(65) Prior Publication Data

US 2009/0167247 A1 Jul. 2, 2009

(30) Foreign Application Priority Data

Dec. 29, 2007 (CN) .......................... 2007 1 0308365

(51) Int. Cl.
*H02J 7/00* (2006.01)
(52) U.S. Cl. ........................ 320/118; 320/136
(58) Field of Classification Search .................. 320/118, 320/103
See application file for complete search history.

(56) References Cited

U.S. PATENT DOCUMENTS

| | | | | |
|---|---|---|---|---|
| 5,530,336 A | * | 6/1996 | Eguchi et al. ................. | 320/118 |
| 5,631,534 A | * | 5/1997 | Lewis ........................... | 320/103 |
| 5,818,201 A | * | 10/1998 | Stockstad et al. ............. | 320/119 |
| 2007/0149875 A1 | * | 6/2007 | Ouyang et al. ................ | 600/347 |
| 2008/0018305 A1 | * | 1/2008 | Altemose ....................... | 320/134 |
| 2008/0106340 A1 | * | 5/2008 | Lee et al. ....................... | 331/16 |
| 2009/0167269 A1 | | 7/2009 | Zhao et al. | |
| 2009/0167747 A1 | | 7/2009 | Gong et al. | |

FOREIGN PATENT DOCUMENTS

| | | |
|---|---|---|
| CN | 1352480 | 6/2002 |
| CN | 1489252 | 4/2004 |
| CN | 2625185 | 7/2004 |
| CN | 1622438 | 6/2005 |
| CN | 1822085 | 8/2006 |
| CN | 1992511 | 7/2007 |
| CN | 101048932 | 10/2007 |
| CN | 101071552 | 11/2007 |
| CN | 101089937 | 12/2007 |
| CN | 101471048 | 7/2009 |
| CN | 101471602 | 7/2009 |
| JP | 11041914 | 2/1999 |
| WO | 0122107 | 3/2001 |
| WO | 2006068430 | 6/2006 |

OTHER PUBLICATIONS

USPTO Transaction History of related U.S. Appl. No. 12/325,331, filed Dec. 1, 2008, entitled "TFT-LCD Driver Circuit and LCD Devices."
USPTO Transaction History of related U.S. Appl. No. 12/343,845, filed Dec. 24, 2008, entitled "Bi-Directional DC Power Circuit."

* cited by examiner

*Primary Examiner* — Arun Williams
(74) *Attorney, Agent, or Firm* — Greenberg Traurig, LLP

(57) ABSTRACT

Voltage balance circuit for dual cell rechargeable battery having a balancing circuit coupled to an integrated control circuit. The balancing circuit can be configured to charge and discharge current during a voltage balancing process allowing a higher charged cell to discharge or dissipate excess capacity to a lower charged cell. The integrated control circuit, having a plurality of modules, can be configured to output balancing directional and timing control signals for signaling the activation and deactivation of the voltage balancing process.

15 Claims, 3 Drawing Sheets

VOLTAGE BALANCE CIRCUIT TO TRANSFER ENERGY BETWEEN CELLS OF A DUEL CELL RECHARGEABLE BATTERY

CROSS-REFERENCE TO RELATED APPLICATION

This application claims priority to Chinese Patent Application No. 200710308365.0, filed Dec. 29, 2007.

FIELD OF THE INVENTION

The embodiments of the present invention relate to balance circuits for batteries, more specifically, to a voltage balance circuit for dual cell rechargeable batteries.

BACKGROUND

High capacity rechargeable batteries currently on the market utilize lithium-ion and iron cells. Because of the high energy densities associated with these cells, there are safety and stability issues. If overcharged, a lithium-ion battery with excess charging capacity may overheat resulting in possible rupture or explosion. If discharging becomes excessive, the battery's durability and ability to maintain a charge may degrade and deteriorate over time. Likewise, iron batteries exhibiting excessive discharges may also lead to early degradation and reduced battery life. Thus, there is a need for a protection circuit for rechargeable batteries to prevent overcharging or excessive discharging in order to minimize battery degradation and shortened battery life.

When dual source rechargeable battery operates in series, a balancing circuit can be employed to minimize the charging capacity differences between the two ends. One of the present balancing methods utilizes energy dissipation, whereby the end of the battery with the higher charged capacity discharges through a discharge logic loop to reduce its charging capacity and achieve equilibrium with the end having lower charged capacity. However, the time it takes for the two ends to reach equilibrium becomes restricted by the discharge logic loop current resulting in lowered discharge current. And as the time it takes to balance the two ends increases, the effectiveness of the balancing circuit decreases resulting in loss of energy.

FIG. 1 illustrates an existing balancing circuit and its working principles. As shown, the balancing circuit starts with a balanced reference value Vref. When a portion of the voltage is higher or lower than Vref, the balancing circuit is activated. The portion of the voltage that exceeds Vref is transmitted to a discharge circuit or logic loop to release the excess voltage. When both sections of the battery have voltages that are higher than or lower than Vref, the balancing circuit is deactivated and nothing passes through the discharge circuit and no excess voltage is released.

Tracing the specific path of the circuit, comparing both sections of the battery after passing through a comparator with the balance reference value Vref, four output states of the comparator correspond to four actual situations, the signals controlling the P-channel metal oxide semiconductor (PMOS) passing through the logic loop can be calculated by the NAND logic operator while signals controlling the N-channel metal oxide semiconductor (NMOS) passing through the logic loop can be calculated by the AND logic operator:

I. Both sections of the battery cell being higher than Vref and both comparator outputs being 1. From the logic operations in the figure above, N_out is 0 and P_out is 1; the balancing circuit is not activated.

II. Battery 1 being higher than Vref, battery 2 being lower than Vref, C1 output is 0 and C2 output is 1. Based on the logic operations, N_out is 1 and P_out is 1; battery 1's balancing bypass discharge circuit is activated.

III. Battery 2 being higher than Vref, battery 1 being lower than Vref, C1 output is 1 and C2 output is 0. Based on the logic operations, N_out is 0 and P_out is 0; battery 2's balancing bypass discharge circuit is activated.

IV. Both sections of the battery cell being lower than Vref and both comparator outputs being 0. From the logic operations in the figure above, N_out is 0 and P_out is 1; the balancing circuit is not activated.

Although this circuit can achieve a certain degree of voltage balancing, its effectiveness depends on the magnitude of the current within the resistor of the discharging bypass circuit. As such, the bypass circuit has poor efficiency and suffers loss of energy due to the resistance. Furthermore, excessive use may cause an increase in resistor temperature and overheating of the battery leading to safety issues.

SUMMARY

Accordingly, a first embodiment discloses a voltage balance circuit for a dual cell rechargeable battery comprising: a balancing circuit configured to charge and discharge current during a voltage balancing process for the rechargeable battery; and an integrated control circuit adaptable to being turned on or off based on charging and discharging current and voltage generated by the balancing circuit during the voltage balancing process for the rechargeable battery. The activation threshold for initiating the voltage balancing process for the rechargeable battery is greater than or equal to 40 mV.

The balancing circuit includes: an inductor; a resistor coupled to the inductor, the resistor capable of detecting an amount of current flow within the inductor; and PMOS and NMOS circuits coupled to the inductor and resistor, wherein the MOS circuits, inductor and resistor are capable of forming closed circuits during the voltage balancing process for the rechargeable battery. The integrated control circuit includes: a voltage detection module capable of detecting voltage differences and outputting balancing activation and directional signals; a delay control module coupled to the voltage detection module, the delay control module configured to output a balancing timing control signal in response to the balancing activation signal; a direct current (DC) modulation module coupled to the voltage detection and delay control modules, the DC modulation module adaptable to being activated or deactivated by the balancing directional and timing control signals; and a driver amplification module coupled to the DC modulation module, the driver amplification module operable to amplify signals from the DC modulation module without altering its logic state. The amplified signals from the driver amplification module are operable to activate and deactivate the balancing circuit.

The voltage detection module includes: first, second, third and fourth divider resistors; first, second and third comparators, wherein the first and second divider resistors are coupled to the cathode of the first and second comparators and the anode of the third comparator, and the third and fourth divider resistors are coupled to the anode of the first and second comparators and the cathode of the third comparator; and a first logic controller coupled to the three comparators, the first logic controller configured to output the balancing activation and directional signals in response to input signals from the three comparators.

The delay control module includes: a reference-voltage circuit adaptable to provide power; a bias circuit coupled to the reference-voltage circuit, the bias circuit capable of generating a corresponding current based on the reference-voltage circuit; an oscillation frequency divider coupled to the bias circuit, the oscillation frequency divider operable to output a control signal based on the current generated by the bias circuit; and a logic delay coupled to the oscillation frequency divider, the logic delay operable to output the balancing timing control signal in response to the control signal from the oscillation frequency divider. The balancing timing control signal has 40 s periods, rectangular waves and 50% duty cycle, and wherein the balancing timing control signal outputs a low logic signal 0 during the voltage balancing process and a high logic signal 1 during a voltage detection process, the voltage balancing and detection processes each being 20 s.

In another embodiment, the DC modulation module includes a maximum reference voltage and a minimum reference voltage. The maximum reference voltage being the product of the resistor and the maximum current within a charging-discharging circuit loop during the voltage balancing process for the rechargeable battery, and the minimum reference voltage being the product of the resistor and the minimum current within the charging-discharging circuit loop during the voltage balancing process for the rechargeable battery.

The DC modulation module includes: first and second error amplifiers, each amplifier operable to amplify voltage on the resistor, wherein activation of the amplifier depends on the balancing directional signal from the voltage detection module; fourth, fifth, sixth and seventh comparators, wherein the fourth and fifth comparators are coupled to the first error amplifier and the sixth and seventh comparators are coupled to the second error amplifier, the fourth comparator adaptable to compare the amplified signal from the first error amplifier with the minimum reference voltage, the fifth comparator adaptable to compare the amplified signal from first error amplifier with the maximum reference voltage, the sixth comparator adaptable to compare the amplified signal from the second error amplifier with the maximum reference voltage, the seventh comparator adaptable to compare the amplified signal from the second error amplifier with the minimum reference voltage; and a second logic controller coupled to the four comparators, the second logic controller configured to receive input from the comparators and output logic signals for activating and deactivating the voltage balancing process for the rechargeable battery.

In another embodiment, a voltage balance circuit for dual cell rechargeable battery can be provided, wherein a voltage detection module can be employed for detecting the voltage within the rechargeable battery, the voltage detection module further being capable of outputting balancing activation signals and balancing directional signals. The circuit also includes a delay control module which outputs balancing control timing signals in response to balancing activation signals. A direct current (DC) modulation module can also be incorporated within the circuit, the DC modulation module, in response to the balancing directional signals, being capable of determining the current and voltage inductance of a voltage control and acquisition module. The DC modulation module can further output balancing timing control signal for determining the activation and deactivation of the voltage balancing process, allowing the battery cell having higher voltage to discharge or dissipate to the battery cell having lower voltage to achieve equilibrium and reduce energy loss. At the same time, the delay control module outputs balancing timing control signals allowing the charging-discharge process and detection process to be separately carried out thereby facilitating real-time testing of the battery's voltage when the battery is not undergoing the voltage balancing process.

The presently disclosed embodiments provide voltage balance circuits for dual cell rechargeable batteries, which enhances the shortcomings associated with current voltage balancing methods including poor balancing effects, loss of energy, and not being able to carry out voltage detection in real-time during the balancing process.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
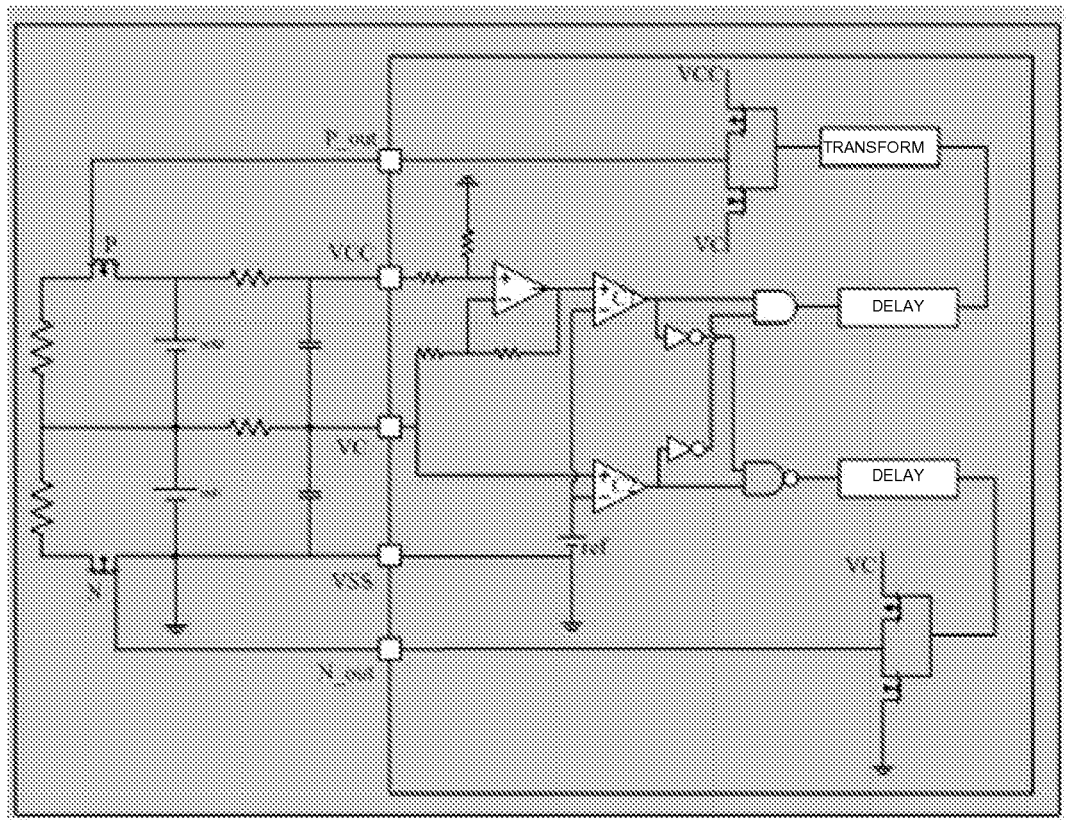
FIG. 1 is a prior art voltage balance circuit.
Figure 2:
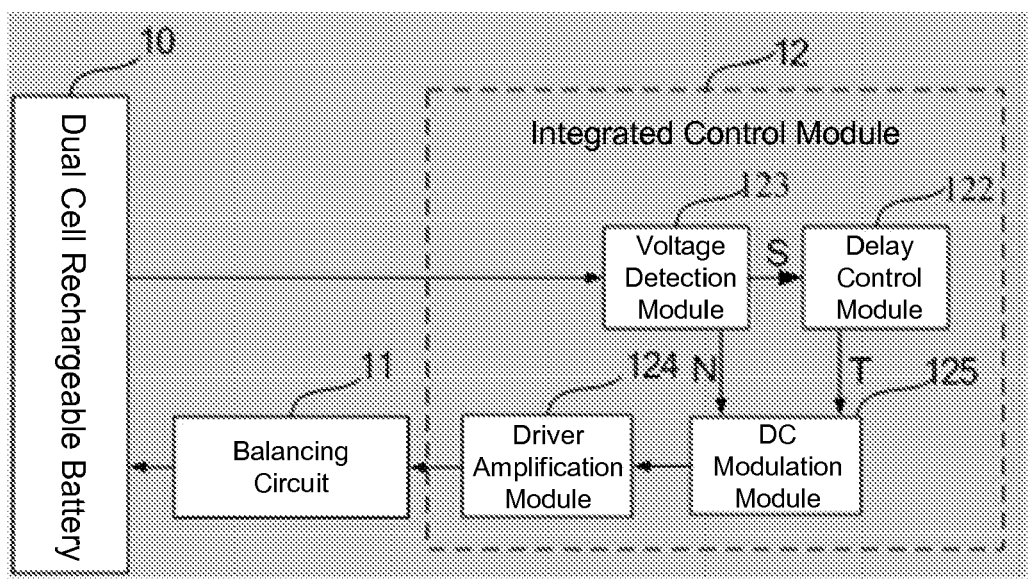
FIG. 2 is a block diagram of a voltage balance circuit for dual cell rechargeable batteries according to an embodiment.

Reference is now made to FIG. 2 showing a block diagram of a voltage balance circuit for dual cell rechargeable batteries according to a first embodiment. The voltage balance circuit includes a balancing circuit 11, an integrated control module 12, and an externally coupled dual cell rechargeable battery 10, which is subjected to the voltage balance process. The balancing circuit 11 can be configured to charge and discharge electrical current during the voltage balance process while the integrated control module 12 can be turned on or off based on the voltage and current generated by the balancing circuit 11 during the voltage balancing process.

The integrated control module 12 includes a voltage detection module 123, a delay control module 122, a direct current (DC) modulation module 125, and a driver amplification module 124. The voltage detection module 123 is capable of detecting voltage differences within the dual cell rechargeable battery 10, and in response to the voltage differences, output corresponding balancing activation signal S and balancing directional signal N. The delay control module 122, in response to the balancing activation signal S, is able to output balancing timing control signal T. The DC modulation module 125, in response to the balancing timing control signal T and balancing directional signal N, is able to output control signal for manipulating the balancing circuit 11 for charging and discharging the dual cell rechargeable battery 10. The driver amplification module 124 is able to receive and amplify the signal from the DC modulation module 125 without altering its logic state resulting in turn on and turn off signals for the balancing circuit 11.

Figure 3:
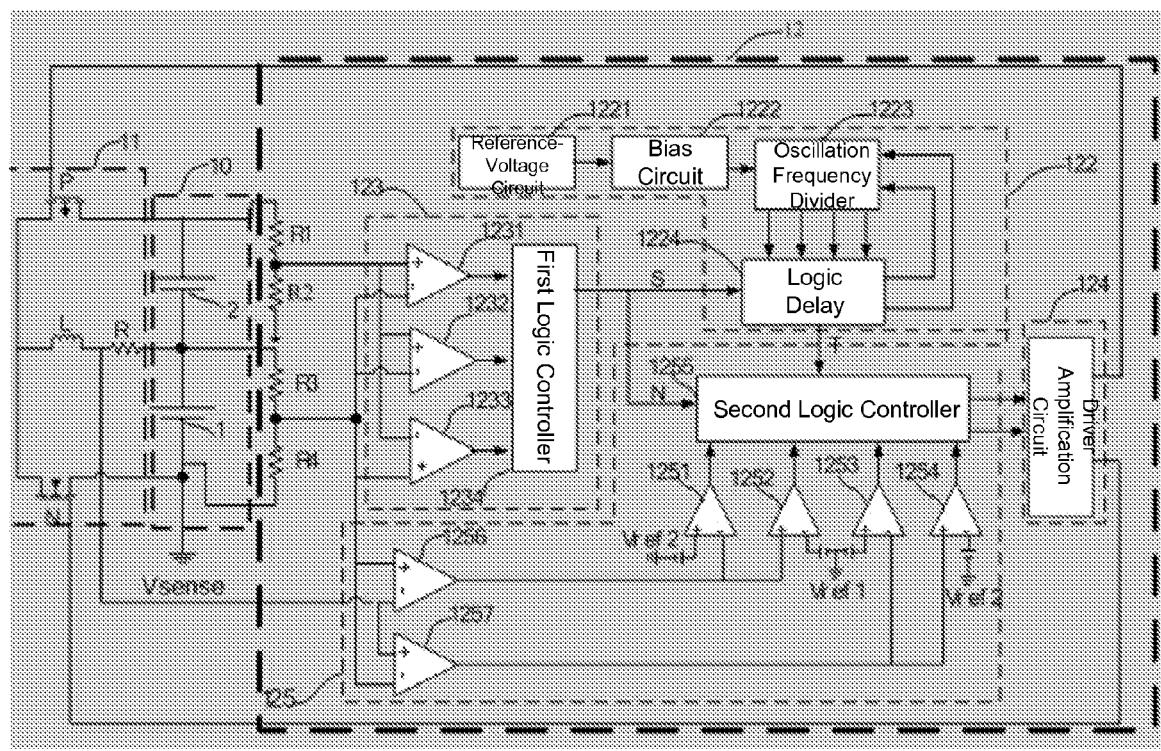
FIG. 3 is a circuit diagram of the voltage balance circuit.

Reference is now made to FIG. 3 illustrating the circuit diagram of the voltage balance circuit whereby the balancing circuit 11 includes an inductor L, a resistor R, and P-channel metal oxide semiconductor (PMOS) and N-channel metal oxide semiconductor (NMOS). The PMOS and NMOS are capable of controlling the charging and discharging processes of the dual cell rechargeable battery 10. The resistor R is capable of detecting the amount of current flow residing in the inductor L. One end of the inductor L passes through the resistor R and couples with the cathode of the first rechargeable battery 1, the first rechargeable battery 1 and the second rechargeable battery 2 being coupled in series, while the opposite end of the inductor L couples with the drain of the PMOS. The source of the NMOS can be coupled to the anode of the first rechargeable battery 1, the gate of the NMOS to the output of the driver amplification circuit 124, the drain of the NMOS to the drain of the PMOS, the source of the PMOS to the cathode of the second rechargeable battery 2, and the gate of the PMOS to the output of the driver amplification circuit 124.

The voltage detection module 123 includes a first divider resistor R1, a second divider resistor R2, a third divider resistor R3, a fourth divider resistor R4, a first logic controller 1234, a first comparator 1231, a second comparator 1232, and a third comparator 1233. As shown, the first and second divider resistors R1, R2 can be coupled to the cathode of the first and second comparators 1231, 1232. These two divider resistors R1, R2 can also be coupled to the anode of the third comparator 1233. Similarly, the third and fourth divider resistors R3, R4 can be coupled to the anode of the first and second comparators 1231, 1232. These two divider resistors R3, R4 can also be coupled to the cathode of the third comparator 1233.

When a voltage difference between the cathode and anode of greater than +10 mV is inputted to the first comparator 1231, a high logic signal 1 can be outputted. When a voltage difference between the cathode and anode of greater than or equal to zero is inputted to the second comparator 1232, a high logic signal 1 can be outputted. When a voltage difference between the cathode and anode of greater than −10 mV is inputted to the third comparator 1233, a high logic signal 1 can be outputted. The voltage detection module 123, based on the voltage difference between the two rechargeable batteries 1, 2 and the differences through the four divider resistors R1, R2, R3, R4, the divider ratio being determined by the first divider resistor R1 and the second divider resistor R2, can exhibit a stepped down voltage difference of about ¼ that of the original voltage difference.

After the comparators 1231-1233 have made the comparative analysis and outputted the proper signals, the first logic controller 1231, in response to the signals from the comparators 1231-1233, can process the logic operations accordingly and generate corresponding balancing activation S and directional N signals, the balancing activation signal S being transmitted to the delay control module 122 while the balancing directional signal N is transmitted to the DC modulation module 125.

The delay control module 122 includes a reference-voltage circuit 1221, a bias circuit 1222, an oscillation frequency divider 1223, and a logic delay 1224. The reference-voltage circuit 1221 is able to provide the delay control module 122 with a steady voltage source while the bias circuit 1222 is able to process the voltage output from the reference-voltage circuit 1221 and generate the proper amount of electrical current. The oscillation frequency divider 1223 operates in response to the electrical current provided by the bias circuit 1222, and outputs control signals for the logic delay 1224.

The logic delay 1224, in response to control signals from the oscillation frequency divider 1223 and the balancing activation signal S from the first logic controller 1234, is able to output balancing timing control signal T to the DC modulation module 125. The cycle of the balancing timing control signal T can also be manipulated by the oscillation frequency divider 1223.

The DC modulation module 125 includes a maximum reference voltage Vref1 and a minimum reference voltage Vref2, the maximum reference voltage Vref1 being the product of the resistor R and the highest current within the charging-discharging circuit loop while the minimum reference voltage Vref2 is the product of the resistor R and the lowest current within the charging-discharging circuit loop. The DC modulation module 125 further includes a second logic controller 1255, a fourth comparator 1251, a fifth comparator 1252, a sixth comparator 1253, a seventh comparator 1254, a first error amplifier 1256 and a second error amplifier 1257. As shown in the figure, the cathode of the fourth comparator 1251 couples to the minimum reference voltage Vref2, the anode of the fifth comparator 1252 to the maximum reference voltage Vref1, the cathode of the sixth comparator 1253 to the maximum reference voltage Vref1, and the anode of the seventh comparator 1254 to the minimum reference voltage Vref2.

The induction voltage from the resistor R within the balancing circuit 11 can be transmitted to the first error amplifier 1256 or the second error amplifier 1257 and subjected to the error amplification process. The error amplified signal from the first error amplifier 1256 can be transmitted to the fourth and fifth comparators 1251, 1252 while the error amplified signals from the second error amplifier 1257 can be transmitted to the sixth and seventh comparators 1253, 1254. During the voltage balancing process, whether the first error amplifier 1256 or the second error amplifier 1257 is selected depends on the balancing control signal transmitted from the voltage detection module 123 to the DC modulation module 125. If the balancing control signal indicates a high logic signal 1, then the second error amplifier 1257 performs the error amplification process on the induction voltage from the resistor R. If the balancing control signal indicates a low logic signal 0, then the first error amplifier 1256 performs the error amplification process on the induction voltage from the resistor R. The second logic controller 1255 and the output from the fourth and fifth comparators 1251, 1252 or the sixth and seventh comparators 1253, 1254, along with the balancing timing control signal T from the delay control module 122, can be logically processed and outputted via the driver amplification circuit 124 to serve as control signals for the PMOS and NMOS within the balancing circuit 11, thus in turn controlling the charging and discharging processes of the rechargeable battery 10.

The voltage balancing process within the dual cell rechargeable battery includes: setting a balancing activation signal S, the balancing process turning on during high logic signal 1 and turning off during low logic signal 0; setting a balancing directional signal N, which when the balancing process is activated and N is 1, the second rechargeable battery 2 transfers energy to the first rechargeable battery 1 and when the balancing process is activated and N is 0, the first rechargeable battery 1 transfers energy to the second rechargeable battery 2; set balancing timing control signal T, which during high logic signal 1, voltage detection takes place within the rechargeable battery and during low logic signal 0, voltage balancing takes place within the rechargeable battery.

When the voltage of the second rechargeable battery 2 is greater than the voltage of the first rechargeable battery 1 and the voltage difference is not less than 40 mV, the voltage detection module 123 outputs high balancing activation signal 1 and high balancing directional signal 1, the balancing activation signal S being transmitted to the delay control module 122 while the balancing directional signal N is transmitted to the DC modulation module 125. The delay control module 122 processes the high balancing activation signal 1 by outputting the balancing timing control signal T to the DC modulation module 125, whereby the DC modulation module 125, in accordance with the balancing timing control signal T and the high balancing directional signal 1, outputs to the driver amplification circuit 124 for signal amplification. When the balancing timing control signal T is low 0, the voltage balancing process is activated and the driver amplification circuit 124 outputs low logic signals 0 to the PMOS and NMOS of the balancing circuit 11 turning on the PMOS and turning off the NMOS. In doing so, the second rechargeable battery 2, inductor L, resistor R and PMOS form a closed circuit whereby the second rechargeable battery 2 is able to charge the inductor L.

The voltage within the resistor R can be provided by the current from the inductor L multiplied by the resistance of the resistor R, the voltage passing through the closed circuit and transmitted to the first error amplifier 1256 within the DC modulation module 125 undergoing the error amplification process to provide an error amplification signal. The fifth comparator 1252 compares the error amplification signal to that of the maximum reference voltage Vref1 while the fourth comparator 1251 compares the error amplification signal to that of the minimum reference voltage Vref2, and the DC modulation module 125 outputs the appropriate control signals based on the analysis by the two comparators 1251, 1252.

When the voltage on the resistor R, after going through the error amplification process, exceeds the predetermined maximum reference voltage Vref1, the driver amplification circuit 124 outputs high logic signals 1 to the PMOS and NMOS turning off the PMOS and turning on the NMOS. In doing so, the first rechargeable battery 1, inductor L, resistor R and NMOS form a closed circuit, the inductor L being able to charge the first rechargeable battery 1. When the voltage on the resistor R, after going through the error amplification process, falls below the predetermined minimum reference voltage Vref2, the driver amplification circuit 124 outputs low logic signals 0 to the PMOS and NMOS turning on the PMOS and turning off the NMOS repeating the charging process described above. When the voltage detection module 123 determines that the first rechargeable battery 1 and the second rechargeable battery 2 have about the same voltage levels, the voltage detection module 123 outputs low balancing activation S signal 0 to the delay control module 122, which in turn transmits a high balancing timing control T signal 1. The DC modulation module 125, in response to the balancing timing control signal T, outputs control signals via the driver amplification circuit 124, low signal 0 to NMOS and high signal 1 to PMOS turning off both the PMOS and NMOS thereby completing the voltage balancing process within the rechargeable battery 10.

When the voltage of the first rechargeable battery 1 exceeds that of the second rechargeable battery 2 and the difference is not less than the balancing activation threshold voltage of 40 mV, the voltage detection module 123 outputs a low balancing directional N signal 0. The process functions in the similar fashion as that described above for when the voltage of the second rechargeable battery 2 exceeds that of the first rechargeable battery 1 and thus will not be elaborated further herein.

When the voltage of the first rechargeable battery 1 exceeds that of the second rechargeable battery 2 and the difference is less than the balancing activation threshold voltage of 40 mV, the voltage detection module 123 outputs low balancing activation S signal 0 to the delay control module 122, which subsequently outputs a high balancing timing control T signal 1. The DC modulation module 125, in response to the high balancing timing control T signal 1, outputs low 0 and high 1 signals. Through the driver amplification module 124, the low signal 0 is amplified and transmitted to the NMOS while the high signal 1 is amplified and transmitted to the PMOS causing both the NMOS and PMOS to turn off thereby terminating the voltage balancing process within the rechargeable battery.

Figure 4:
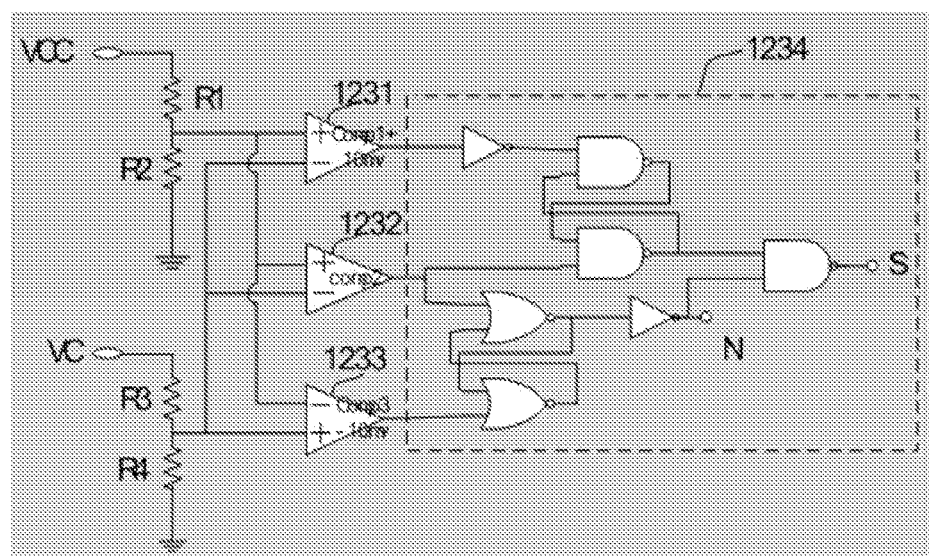
FIG. 4 is a logic circuit diagram of the voltage detection module.
Figure 5:
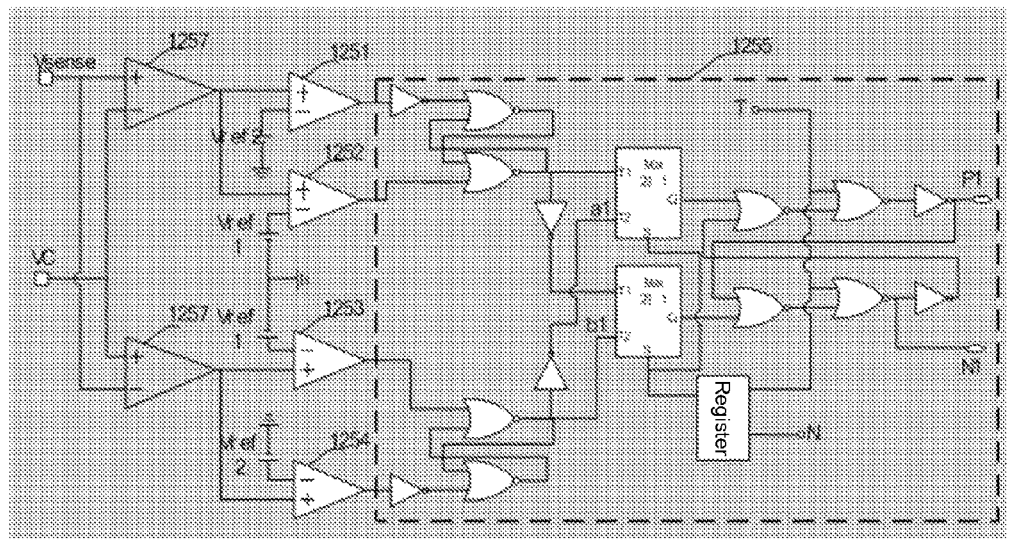
FIG. 5 is a logic circuit diagram of the DC modulation module.

Reference is now made to FIGS. 4-5 illustrating logic circuit diagrams of the voltage detection module 123 and the DC modulation module 125, respectively. In one embodiment, if the first rechargeable battery 1 has a voltage of 3V and the second rechargeable battery has a voltage of 2.998V, then the first rechargeable battery 1 has a higher voltage than the second rechargeable battery 2. The voltage detection module 123 is able to detect the voltage levels of the two rechargeable batteries 1, 2 and determine that the difference is 1 mV, which is less than the predetermined balancing process activation threshold voltage of 40 mV, the 40 mV being the ratio (4) of the first divider resistor R1 to the second divider resistor R2 multiplied by the +10 mV of the first comparator 1231.

In this instance, the first comparator 1231 outputs a low signal 0, the second comparator 1232 outputs a low signal 0, and the third comparator 1233 outputs a low signal 0. After processing by the first logic controller 1234, a low balancing activation S signal 0 will be outputted and transmitted to the logic delay 1224 of the delay control module 122. The logic delay 1224 receives and processes the low balancing activation S signal 0 and outputs a high balancing timing control T signal 1 to the second logic controller 1255 within the DC modulation module 125. The second logic controller 1255 receives and processes the high balancing timing control T signal 1 and outputs high signal 1 to the PMOS and low signal 0 to the NMOS turning off both the PMOS and NMOS thus deactivating the voltage balancing process.

In another embodiment, if the first rechargeable battery 1 has a voltage of 3V and the second rechargeable battery has a voltage of 2.948V, then the first rechargeable battery 1 has a higher voltage than the second rechargeable battery 2. The voltage detection module 123 is able to detect the voltage difference of 52 mV between the two rechargeable batteries 1, 2, which is greater than the predetermined balancing process activation threshold voltage of 40 mV.

In this instance, the four divider resistors R1-R4 of the voltage detection module 123 will divide the voltage difference among the four resistors (52 mV/4=13 mV). When the cathode and anode of the first comparator 1231 receives a voltage difference of greater than +10 mV, the first comparator 1231 outputs a high signal 1, the second comparator 1232 outputs a high signal 1, and the third comparator 1233 outputs a low signal 0. After processing by the first logic controller 1234, a high balancing activation S signal 1 and a low balancing directional N signal 0 will be outputted, whereby the high balancing activation S signal 1 will be transmitted to the logic delay 1224 of the delay control module 122 while the low balancing directional N signal 0 will be transmitted to the second logic controller 1255.

Figure 6:
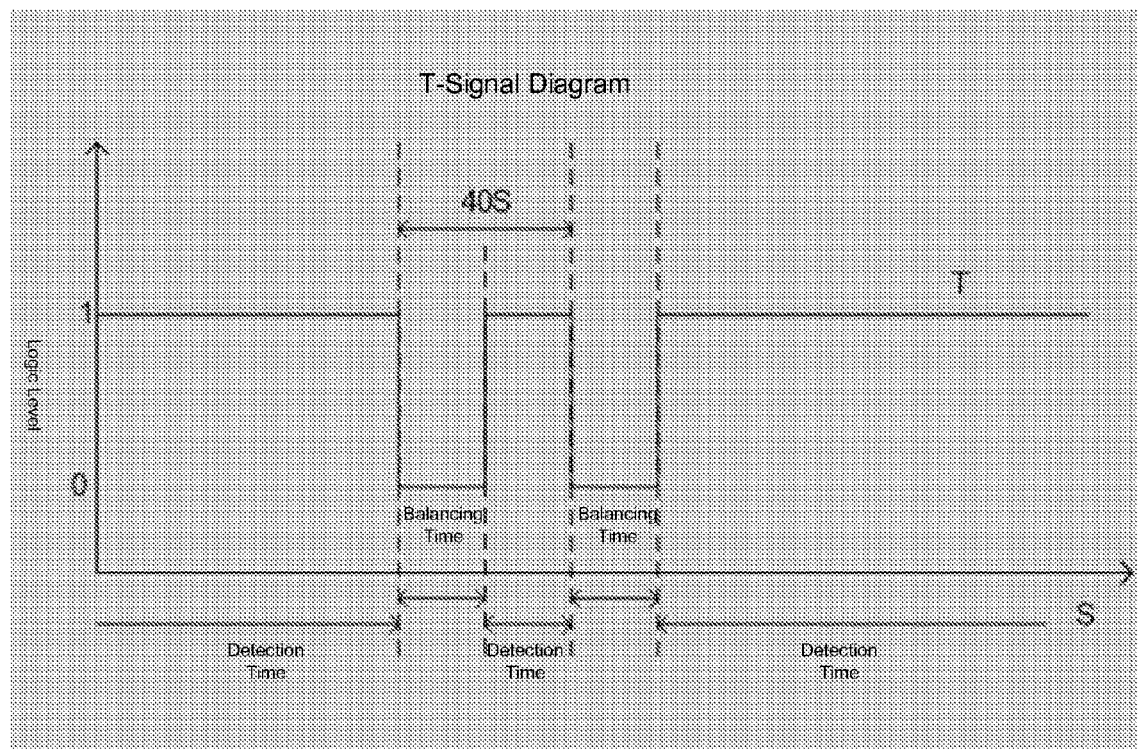
FIG. 6 is a balancing timing control signal waveform diagram of the logic delay.

Reference is now made to FIG. 6 illustrating a balancing timing control signal T waveform diagram of the logic delay 1224, whereby high balancing activation S signal 1 can be processed by the logic delay 1224 and a balancing timing control signal T can be outputted, the balancing timing control signal T being initially at low logic signal 0 with a 40 s cycle, and 50% duty cycle with rectangular waves. When the balancing timing control signal T is low 0, indicative of active balancing and voltage processing, the signal T can be transmitted from the logic delay 1224 of the delay control module 122 to the second logic controller 1255 of the DC modulation module 125. The first logic controller 1234 transmits the balancing directional signal N to the second logic controller 1255 of the DC modulation module 125 for making the proper pathway selection. When a high balancing directional N signal 1 is provided, the second error amplifier 1257 and the sixth and seventh comparators 1253, 1254 are activated. When a low balancing directional N signal 0 is provided, the first error amplifier 1256 and the fourth and fifth comparators 1251, 1252 are activated. During this time the fourth and fifth comparators 1251, 1252 output low logic signals 0 and the second logic controller 1255, in response to the low logic signals 0, outputs high logic signals 1 to both the NMOS and PMOS turning off the PMOS and turning on the NMOS. In doing so the inductor L, resistor R, NMOS and the first rechargeable battery 1 form a closed circuit, which enables the first rechargeable battery 1 to charge the inductor L such that the current on the inductor L passes through the resistor R producing an induction voltage, and can subsequently be transmitted to the first error amplifier 1256 within the DC modulation module 125 for the error amplification process thus further amplifying the signal. The signal can also be transmitted to the fourth and fifth comparators 1251, 1252 and compared with the maximum and minimum reference voltages Vref1, Vref2.

When the error amplified signal falls between the maximum and minimum reference voltages Vref1, Vref2, the fourth comparator 1251 outputs a high logic signal 1, the fifth comparator 1252 outputs a low logic signal 0, and the second logic controller 1255 transmits a high logic signal 1 to both the NMOS and PMOS turning off the PMOS and turning on the NMOS. The first rechargeable battery 1 continues to charge the inductor L further increasing the current within the inductor L. When the error amplified signal exceeds the maximum reference voltage Vref1, the fourth and fifth comparators 1251, 1252 output high logic signals 1 and the second logic controller 1255 transmits low logic signals 0 to both the NMOS and PMOS turning on the PMOS and turning off the NMOS. Because the PMOS, inductor L, resistor R and the second rechargeable battery 2 have now formed a closed circuit, the inductor L is able to charge the second rechargeable battery 2 thus reducing the current within the inductor L and consequently the inductive voltage of the resistor R.

When the error amplified signal, after being processed by the first error amplifier 1256, falls between the maximum and minimum reference voltages Vref1, Vref2, the fourth comparator 1251 outputs a high logic signal 1, the fifth comparator 1252 outputs a low logic signal 0, and the second logic controller 1255 transmits low logic signals 0 to both the NMOS and PMOS turning on the PMOS and turning off the NMOS. The inductor L continues to charge the second rechargeable battery 2. When the error amplified signal, after being processed by the first error amplifier 1256, is less than the minimum reference voltage Vref2, the fourth and fifth comparators 1251, 1252 output low logic signals 0 and the second logic controller 1255 transmits high logic signals 1 to both the NMOS and PMOS turning off the PMOS and turning on the NMOS. Because the inductor L, resistor R, NMOS and the first rechargeable battery 1 have now formed a closed circuit, the first rechargeable battery 1 is able to charge the inductor L thereby repeating the processes described above.

During the voltage balancing process, when the balancing timing control signal T is high 1, the balancing process is inactive and voltage detection can be carried out on the rechargeable batteries. During this time, inspection and analysis can be carried out to determine whether the previous balancing process has effectively equilibrated the rechargeable batteries. If the rechargeable batteries are still not balanced or in equilibrium, the voltage balancing processes described above continues. If the first and second rechargeable batteries 1, 2, after the balancing process, are able to achieve a balanced or state of equilibrium, i.e., the voltage of the first rechargeable battery 1 being substantially the same as that of the second rechargeable battery 2, the voltage detection module 123 can transmit the detected voltage for comparison purposes through the second comparator 1232, which outputs a low logic signal 0 to the first logic controller 1234, which outputs a low balancing activation S signal 0 to the logic delay 1224 of the delay control module 122. After the delay control module 122 processes the signal, it transmits a high balancing timing control T signal 1 to the second logic controller 1255 of the DC modulation module 125 via the logic delay 1224. After processing by the second logic controller 1255, a high logic signal 1 can be transmitted to the PMOS and a low logic signal 0 can be transmitted to the NMOS effectively turning off both the PMOS and NMOS and terminating the voltage balancing processes.

In another embodiment, if the second rechargeable battery 2 has a voltage of 3V and the first rechargeable battery 1 has a voltage of 2.958V, then the second rechargeable battery 2 has a higher voltage than the first rechargeable battery 1. Here, the voltage detection module 123 processes a high balancing directional N voltage 1 can be outputted, the pathway through the secondary error amplifier 1257 within the DC modulation module 125 is selected, along with the sixth and seventh comparators 1253, 1254. The voltage balancing process continues in a similar fashion to that described above and will not be elaborated further herein.

Although the invention has been described in detail with reference to several embodiments, additional variations and modifications exist within the scope and spirit of the invention as described and defined in the following claims.

What is claimed is:

1. A voltage balance circuit for a dual cell rechargeable battery comprising:
   a balancing circuit configured to charge and discharge current during a voltage balancing process for the rechargeable battery
   wherein the balancing circuit includes:
      an inductor;
      a resistor coupled to the inductor, the resistor capable of detecting an amount of current flow within the inductor; and
      PMOS and NMOS circuits coupled to the inductor and resistor, wherein the MOS circuits, inductor and resistor are capable of forming closed circuits during the voltage balancing process for the rechargeable battery; and
   an integrated control circuit adaptable to being turned on or off based on charging and discharging current and voltage generated by the balancing circuit during the voltage balancing process for the rechargeable battery;

wherein the integrated control circuit includes:
- a voltage detection module capable of detecting voltage differences and outputting balancing activation and directional signals;
- a delay control module coupled to the voltage detection module, the delay control module configured to output a balancing timing control signal in response to the balancing activation signal;
- a direct current (DC) modulation module coupled to the voltage detection and delay control modules, the DC modulation module adaptable to being activated or deactivated by the balancing directional and timing control signals;
  - wherein the DC modulation module includes:
    - first and second error amplifiers, each amplifier operable to amplify voltage on the resistor, wherein activation of the amplifier depends on the balancing directional signal from the voltage detection module;
    - fourth, fifth, sixth and seventh comparators, wherein the fourth and fifth comparators are coupled to the first error amplifier and the sixth and seventh comparators are coupled to the second error amplifier, the fourth comparator adaptable to compare the amplified signal from the first error amplifier with the minimum reference voltage, the fifth comparator adaptable to compare the amplified signal from first error amplifier with the maximum reference voltage, the sixth comparator adaptable to compare the amplified signal from the second error amplifier with the maximum reference voltage, the seventh comparator adaptable to compare the amplified signal from the second error amplifier with the minimum reference voltage; and
    - a second logic controller coupled to the four comparators, the second logic controller configured to receive input from the comparators and output logic signals for activating and deactivating the voltage balancing process for the rechargeable battery;

and
- a driver amplification module coupled to the DC modulation module, the driver amplification module operable to amplify signals from the DC modulation module without altering its logic state.

2. The circuit of claim 1, wherein the activation threshold for initiating the voltage balancing process for the rechargeable battery is greater than or equal to 40 mV.

3. The circuit of claim 1, wherein the amplified signals from the driver amplification module are operable to activate and deactivate the balancing circuit.

4. The circuit of claim 1, wherein the voltage detection module includes:
- first, second, third and fourth divider resistors;
- first, second and third comparators, wherein the first and second divider resistors are coupled to the cathode of the first and second comparators and the anode of the third comparator, and the third and fourth divider resistors are coupled to the anode of the first and second comparators and the cathode of the third comparator; and
- a first logic controller coupled to the three comparators, the first logic controller configured to output the balancing activation and directional signals in response to input signals from the three comparators.

5. The circuit of claim 1, wherein the delay control module includes:
- a reference-voltage circuit adaptable to provide power;
- a bias circuit coupled to the reference-voltage circuit, the bias circuit capable of generating a corresponding current based on the reference-voltage circuit;
- an oscillation frequency divider coupled to the bias circuit, the oscillation frequency divider operable to output a control signal based on the current generated by the bias circuit and output a control signal; and
- a logic delay coupled to the oscillation frequency divider, the logic delay operable to output the balancing timing control signal in response to the control signal from the oscillation frequency divider.

6. The circuit of claim 5, wherein the balancing timing control signal has 40 s periods, rectangular waves and 50% duty cycle, and wherein the balancing timing control signal outputs a low logic signal 0 during the voltage balancing process and a high logic signal 1 during a voltage detection process, the voltage balancing and detection processes each being 20 s.

7. The circuit of claim 1, wherein the DC modulation module includes a maximum reference voltage and a minimum reference voltage.

8. The circuit of claim 7, wherein the maximum reference voltage is the product of the resistor and the maximum current within a charging-discharging circuit loop during the voltage balancing process for the rechargeable battery while the minimum reference voltage is the product of the resistor and the minimum current within the charging-discharging circuit loop during the voltage balancing process for the rechargeable battery.

9. A voltage balance circuit for a dual cell rechargeable battery comprising:
- a balancing circuit configured to charge and discharge current during a voltage balancing process for the rechargeable battery, the balancing circuit comprising:
  - an inductor;
  - a resistor coupled to the inductor, the resistor configured to detect current flow within the inductor; and
  - PMOS and NMOS circuits coupled to the inductor and resistor, wherein the MOS circuits, inductor and resistor are capable of forming closed circuits during the voltage balancing process for the rechargeable battery; and
- an integrated control circuit capable of being activated or deactivated depending on charging and discharging current and voltage generated by the balancing circuit during the voltage balancing process for the rechargeable battery, the integrated control circuit comprising:
  - a voltage detection module operable to detect voltage differences and output balancing activation and directional signals;
  - a delay control module coupled to the voltage detection module, the delay control module operable to output a balancing timing control signal in response to the balancing activation signal;
  - a direct current (DC) modulation module coupled to the voltage detection and delay control modules, the DC modulation module operable to being activated and deactivated by the balancing directional and timing control signals
    - wherein the DC modulation module includes:
      - a maximum reference voltage and a minimum reference voltage, the maximum reference voltage being the product of the resistor and the maximum current within a charging-discharging circuit loop during the voltage balancing process for the rechargeable battery, and the minimum reference voltage being the product of the resistor and the minimum current within the charging-discharging circuit loop during the voltage balancing process for the rechargeable battery;

first and second error amplifiers, each amplifier configured to amplify voltage on the resistor, wherein activation and selection of the amplifier depends on the balancing directional signal of the voltage detection module;

fourth, fifth, sixth and seventh comparators, wherein the fourth and fifth comparators are coupled to the first error amplifier and the sixth and seventh comparators are coupled to the second error amplifier, the fourth comparator capable of comparing the amplified signal from the first error amplifier with the minimum reference voltage, the fifth comparator capable of comparing the amplified signal from first error amplifier with the maximum reference voltage, the sixth comparator capable of comparing the amplified signal from the second error amplifier with the maximum reference voltage, the seventh comparator capable of comparing the amplified signal from the second error amplifier with the minimum reference voltage; and a second logic controller coupled to the four comparators, the second logic controller adaptable to receive input from the comparators and output logic signals for activating and deactivating the voltage balancing process for the rechargeable battery; and a driver amplification module coupled to the DC modulation module, the driver amplification module operable to amplify signals from the DC modulation module without altering its logic state.

10. The circuit of claim 9, wherein the activation threshold for initiating the voltage balancing process for the rechargeable battery is greater than or equal to 40 mV.

11. The circuit of claim 9, wherein the amplified signals from the driver amplification module are operable to activate and deactivate the balancing circuit.

12. The circuit of claim 9, wherein the voltage detection module includes:

first, second, third and fourth divider resistors;

first, second and third comparators, wherein the first and second divider resistors are coupled to the cathode of the first and second comparators and the anode of the third comparator, and the third and fourth divider resistors are coupled to the anode of the first and second comparators and the cathode of the third comparator; and a first logic controller coupled to the three comparators, the first logic controller operable to output the balancing activation and directional signals in response to input signals from the three comparators.

13. The circuit of claim 12, wherein the delay control module includes:

a reference-voltage circuit adaptable to provide a source of power;

a bias circuit coupled to the reference-voltage circuit, the bias circuit operable to generate a corresponding current based on the reference-voltage circuit;

an oscillation frequency divider coupled to the bias circuit, the oscillation frequency divider operable to receive the current from the bias circuit and output a control signal; and a logic delay coupled to the oscillation frequency divider, the logic delay configured to output the balancing timing control signal in response to the control signal from the oscillation frequency divider.

14. The circuit of claim 13, wherein the balancing timing control signal has 40 s periods, rectangular waves and 50% duty cycle, and wherein the balancing timing control signal outputs a low logic signal 0 during the voltage balancing process and a high logic signal 1 during a voltage detection process, the voltage balancing and detection processes each being 20 s.

15. A voltage balance circuit for a dual cell rechargeable battery comprising:

a balancing circuit having an inductor, a resistor coupled to the inductor for detecting current within the inductor, and PMOS and NMOS circuits coupled to the inductor and resistor, wherein the MOS circuits, inductor and resistor are capable of forming closed circuits for charging and discharging current during a voltage balancing process for the rechargeable battery; and an integrated control circuit comprising:

a voltage detection module capable of detecting voltage differences, the voltage detection module having first, second, third and fourth divider resistors, first, second and third comparators, wherein the first and second divider resistors are coupled to the cathode of the first and second comparators and the anode of the third comparator, and the third and fourth divider resistors are coupled to the anode of the first and second comparators and the cathode of the third comparator, and a first logic controller coupled to the three comparators, the first logic controller operable to output balancing activation and directional signals;

a delay control module coupled to the voltage detection module, the delay control module having a reference-voltage circuit adaptable to provide power, a bias circuit coupled to the reference-voltage circuit for generating a current based on the power from the reference-voltage circuit, an oscillation frequency divider coupled to the bias circuit, the oscillation frequency divider operable to output a control signal in response to the current received from the bias circuit, and a logic delay coupled to the oscillation frequency divider, the logic delay operable to output a balancing timing control signal in response to the control signal from the oscillation frequency divider;

a direct current (DC) modulation module coupled to the voltage detection and delay control modules, the DC modulation module having first and second error amplifiers, each amplifier capable of amplifying voltage on the resistor, wherein selection of the amplifier pathway depends on the balancing directional signal from the voltage detection module, fourth, fifth, sixth and seventh comparators, wherein the fourth and fifth comparators are coupled to the first error amplifier and the sixth and seventh comparators are coupled to the second error amplifier, the fourth comparator capable of comparing the amplified signal from the first error amplifier with a minimum reference voltage, the fifth comparator capable of comparing the amplified signal from first error amplifier with a maximum reference voltage, the sixth comparator capable of comparing the amplified signal from the second error amplifier with the maximum reference voltage, the seventh comparator adaptable to compare the amplified signal from the second error amplifier with the minimum reference voltage, and a second logic controller coupled to the four comparators, the second logic controller configured to receive input from the comparators and output logic signals for activating and deactivating the voltage balancing process for the rechargeable battery; and a driver amplification module coupled to the DC modulation module, the driver amplification module operable to amplify signals from the DC modulation module without altering its logic state.

* * * * *